(12) United States Patent
Mabboux et al.

(10) Patent No.: US 6,338,467 B1
(45) Date of Patent: Jan. 15, 2002

(54) BUTTERFLY VALVE DEVICE FOR CONNECTING AND ISOLATING FLUID CONDUITS

(75) Inventors: Lionel Jean Mabboux, Sainte Geneviève; Gerard Jean Andre Le Clanche, Draveil, both of (FR)

(73) Assignee: Vernet S.A., Arpajon Cedex (FR)

( * ) Notice: Subject to any disclaimer, the term of this patent is extended or adjusted under 35 U.S.C. 154(b) by 0 days.

(21) Appl. No.: 09/617,780

(22) Filed: Jul. 17, 2000

(30) Foreign Application Priority Data

Jul. 19, 1999 (FR) .............................. 99 09350

(51) Int. Cl.[7] .............................................. F16K 1/22
(52) U.S. Cl. ......................................................... 251/305
(58) Field of Search .......................................... 251/305

(56) References Cited

U.S. PATENT DOCUMENTS

| | | |
|---|---|---|
| 5,269,347 A | 12/1993 | Beasley |
| 5,673,895 A * | 10/1997 | Kaneko ...................... 251/306 |
| 5,979,871 A * | 11/1999 | Forbes et al. ............... 251/305 |
| 6,123,318 A * | 9/2000 | Forbes et al. ............... 251/173 |
| 6,273,119 B1 * | 8/2001 | Foster et al. ................ 251/305 |

FOREIGN PATENT DOCUMENTS

| | | |
|---|---|---|
| DE | 29 25 237 | 1/1981 |
| DE | 32 20 963 | 12/1983 |
| DE | 35 09 352 | 9/1986 |

* cited by examiner

Primary Examiner—John Fox
(74) Attorney, Agent, or Firm—Wenderoth, Lind & Ponack, L.L.P.

(57) ABSTRACT

A butterfly valve device includes two members (1A, 2B) forming a casing with at least one passage (10) containing a butterfly valve (2) fixed to a pivoting spindle (3) and having joint surfaces pressed together in a joint plane (11) transverse to the passage and passing through the axis of the spindle. Packings (4A, 4B) in the joint surfaces at the perimeter of the passage are pressed together to form a ring through which the spindle passes in a sealed manner; the packings (4A, 4B) have different inside dimensions to define two faces (43) transverse to the perimeter of the passage forming seats for the butterfly valve (2) oriented in opposite directions. The device can include a plurality of passages provided with a butterfly valve. It can also include a motor-drive device to drive the spindle in rotation. The butterfly valve device can be used in the cooling circuits of vehicle engines.

13 Claims, 4 Drawing Sheets

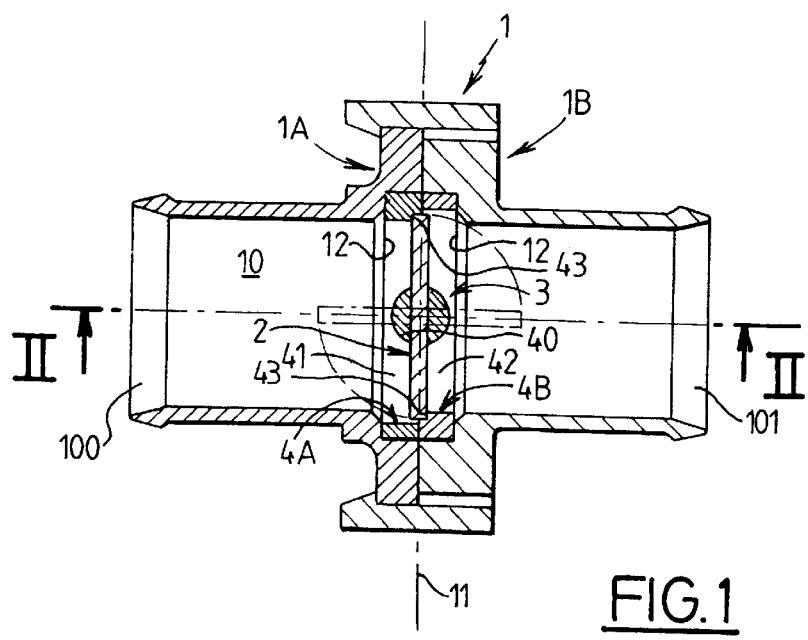
FIG.1
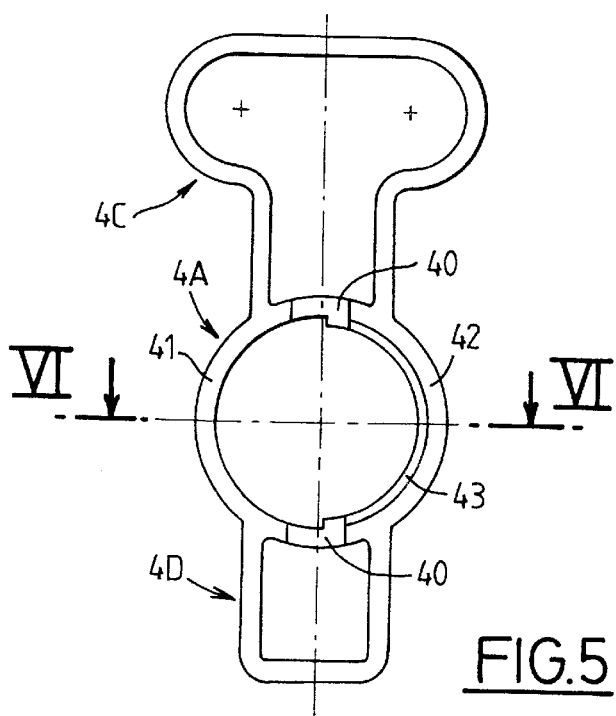
FIG.5
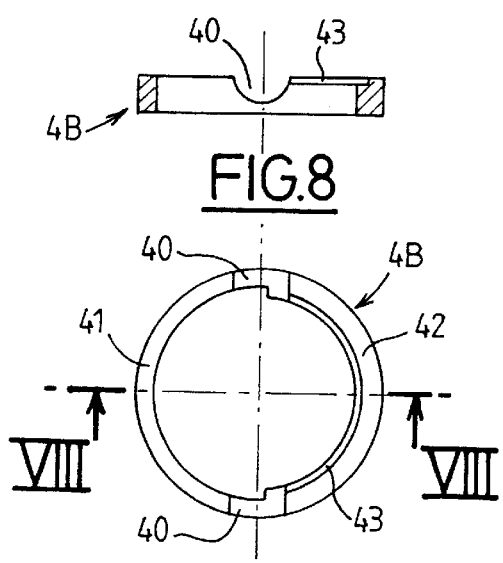
FIG.8
FIG.7
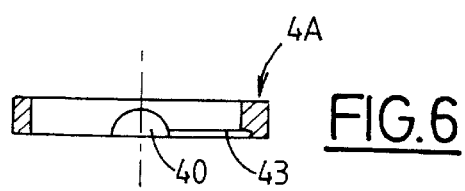
FIG.6

BUTTERFLY VALVE DEVICE FOR CONNECTING AND ISOLATING FLUID CONDUITS

BACKGROUND OF THE INVENTION

The invention relates to butterfly valves and a particular object of the invention is to provide a butterfly valve device for connecting and isolating conduits providing a good seal despite a simple arrangement enabling easy manufacture in a version that can be motorized and can include a plurality of channels.

Butterfly valves introduce only a small head loss and constitute balanced systems. They are of benefit in automobile vehicle cooling circuits, in which pumps of relatively low power (100 watts to 200 watts) could then be used; furthermore, these valves could easily be actuated by motors such as steeper motors. However, an application of this kind in the thermostatic art requires an excellent seal, which makes it difficult to use such valves at present.

SUMMARY OF THE INVENTION

The object of the invention is to remedy this drawback and to this end the invention provides a device for connecting and isolating fluid conduits, the device including a casing incorporating at least one fluid passage discharging from the casing via ports adapted to be connected to the conduits and containing at least one butterfly valve fixed to a spindle which can pivot about its longitudinal axis, characterized in that the casing includes two casing members having respective joint surfaces which are pressed together in at least one joint plane crossing the passage transversely and passing through the axis of the spindle, and the joint surfaces each include a cavity enlarging the passage all around its perimeter and in which a packing is housed, the two packings facing each other across the passage and being pressed together in the joint plane to constitute a sealing ring which incorporates two aligned holes in which two regions of the spindle on respective opposite sides of the butterfly valve are mounted to pivot in sealed contact all around their perimeter, and each packing has a first inside wall portion between the holes on one side of the passage with dimensions adapted to enable the butterfly valve to pivot on this side from a fully open position in which it is approximately longitudinal in the passage to an approximately transverse closed position, and a second internal wall portion between the holes on the other side of the passage and having dimensions adapted to prevent access to the closed position from that side, the first internal wall portion of each packing being adjacent the second portion of the other packing, each second portion projecting farther into the passage than the adjacent first portion over at least part of the length of the packing to define a face extending transversely to the perimeter of the passage, from one hole of the sealing ring to the other, forming a seat for the butterfly valve, the faces of the two packings forming seats facing in opposite directions.

Thanks to the above design, the two packings provide a seal between the two regions of the fluid flow passage on respective opposite sides of the butterfly valve in the closed position, a seal between the passage and the exterior and a seal for the spindle carrying the butterfly valve.

The device can further have one or more of the following features:

- on respective opposite sides of the butterfly valve the spindle is accommodated in housings provided for it in the two casing members and the joint surface of at least one of the two members incorporates grooves on respective opposite sides of the passage, in the form of loops surrounding the housing at a distance and discharging into the cavity for the packing of the member, and sealing loops in one piece with the packing are accommodated in the grooves,

- it includes at least two passages in the casing in each of which there is a butterfly valve,

- the passages discharge to the exterior of the casing via ports one of which is common to those passages, which open into each other on the same side as that port,

- the butterfly valves are fixed to the same spindle and are in perpendicular planes so that one is fully open when the other is closed,

- around each passage, the joint surfaces of the two casing members each have a cavity enlarging the passage all around its perimeter and in which a packing is accommodated, the two packings around each passage being pressed together at the joint plane to constitute a sealing ring with aligned holes through it in which two regions of the spindle are mounted to pivot in sealed contact all around their perimeter, the two packings each having a face forming a set for the butterfly valve, the faces of the two packings forming seats facing in opposite directions,

- the same spindle carries the two butterfly valves and extends in the casing on respective opposite sides of and between the two butterfly valves in housings in which it is supported by rings, and the joint surface of at least one of the two casing members incorporates grooves between the cavities surrounding the passages and in respective loops on either side of the passages at a distance around the housings, and said grooves accommodate connecting branches of the packings and the sealing loops in one piece with the packings,

- it includes a motor fixed to the exterior of a casing member, the spindle is extended on one side of a passage and projects into a chamber of the casing into which an output shaft of the motor also projects, and the output shaft is connected to the spindle by connecting means so that rotation of the shaft drives rotation of the spindle,

- it includes motor-drive means consisting of a wax expansion thermostat and the spindle is extended on one side of a passage, projects into a chamber of the casing into which a mobile rod associated with the thermostat also projects, and the mobile rod is connected to the spindle by connecting means so that movement in translation of the mobile rod drives rotation of the spindle,

- one of the grooves surrounds at a distance a combination formed by the chamber and a housing for the spindle and a sealing loop in one piece with a packing is housed in said groove.

BRIEF DESCRIPTION OF THE DRAWINGS

Other features and advantages of the invention will emerge from the following description of embodiments of the invention, which description is given by way of non-limiting example and illustrated by the accompanying drawings, in which:

FIG. 1 is a diagrammatic sectional view of one embodiment of a quarter-turn valve according to the invention, FIG. 5 is an exterior view of packing that can be seen in FIG. 3, FIG. 6 is a view of the packing shown in FIG. 5 in section taken along the line VI—VI in that figure, FIG. 7 is an exterior view of packing that can be seen in FIG. 4, FIG. 8 is a view of the packing shown in FIG. 7 in section taken along the line VIII—VIII in that figure.

DETAILED DESCRIPTION OF THE INVENTION

Figure 2:
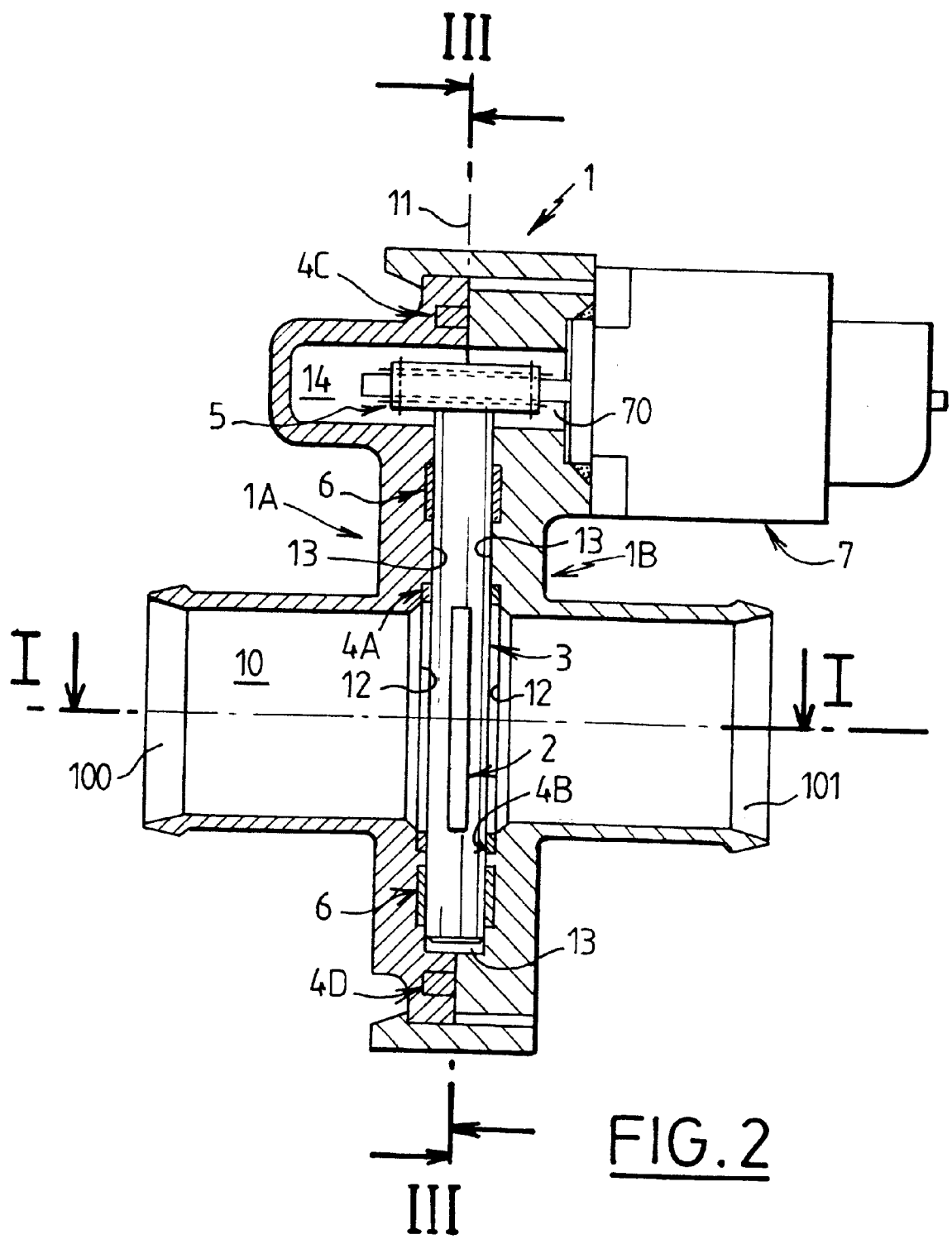
FIG. 2 is a diagrammatic sectional view taken along the line II—II in FIG. 1 of the embodiment shown in that figure operated by a motor.

The butterfly valve device according to the invention includes a casing 1 consisting of two casing member 1A, 1B which are assembled together, for example clipped together, and in which there is at least one fluid flow passage 10 opening to the outside of the casing via ports 100, 101 adapted to be connected to conduits which can be connected or isolated by the device.

The passage 10 includes a butterfly valve 2 fixed to a spindle 3 which can pivot about its longitudinal axis and the butterfly valve is itself therefore able to pivot between a fully open position in which it extends longitudinally in the passage and a closed position in which it extends transversely therein in order to connect or isolate the conduits connected to the ports 100, 101. The spindle 3 extends on respective opposite sides of the butterfly valve into two housings in the two casing members 1A, 1B, where it is supported by rings, as described below.

The two casing members are disposed face-to-face at respective joint surfaces and pressed together in at least one joint plane 11 crossing the passage 10 transversely and passing through the longitudinal pivot axis of the spindle 3. The butterfly valve also extends along this joint surface when it is closed.

The joint surfaces include a cavity 12 all around the perimeter of the passage 10, opening into the passage and enlarging it all along that perimeter; each of the two cavities 12 houses a packing 4A, 4B which projects slightly relative to the joint plane 11 when the two casing members are not pressed together, so that the face-to-face packings 4A, 4B around the passage 10 are pressed together in the joint plane when the members 1A, 1B are pressed together and are compressed to constitute a sealing ring around the passage.

The depth of the cavities 12 and the thickness of the packings 4A, 4B are greater than the radius of the spindle 3 and the thickness of the sealing ring is therefore greater than the diameter of the spindle.

The passage 10 is circular and likewise the ring around it.

Opposite regions of the ring incorporate two aligned holes which are therefore radial in this instance. Two regions of the spindle 3 on respective opposite sides of the butterfly valve 2 are mounted in these holes to pivot with sealed contact all around their perimeter.

The two circular holes are each formed by two facing semicircular cavities 40 recessed into the joint surfaces of the packings 4A, 4B.

Each of the packings 4A, 4B has, between the two cavities 40, and therefore between the two holes in the ring, a first internal wall portion 41 on one side of the passage 10 with dimensions adapted to allow free pivoting of the butterfly valve 2 on this side and thereby free access to the joint plane 11, i.e. in the case of a circular butterfly valve, a portion whose inside radius is greater than that of the butterfly valve, and, between the two cavities 40 but on the other side of the passage, a second internal wall portion 42 with dimensions adapted to prevent access to the joint plane 11 on this side and thus to the closed position, i.e. in the case of a circular butterfly valve, a portion whose inside radius is less than that of the butterfly valve.

The two packings 4A, 4B are pressed together and the first inside wall portion 41 of each packing is therefore adjacent the second portion 42 of the other packing. Accordingly, each second portion 42 projects further into the passage than the adjacent first portion and a face 43 is defined extending transversely to the perimeter of the passage, from one hole in the sealing ring to the other, forming a set for the butterfly valve. The respective faces 43 of the two packings therefore face in opposite directions.

The second portion 24 of each packing preferably projects farther than the first portion 41 over only part of its length, this second portion having on the same side as the joint plane 11 a recess whose depth is approximately equal to half the thickness of the butterfly valve 2; the face 43 is therefore set back in each packing and, when it is closed, the butterfly valve 2 assumes a direction in the joint plane 11 perpendicular to the direction of flow of the fluid in the passage 10.

Figure 4:
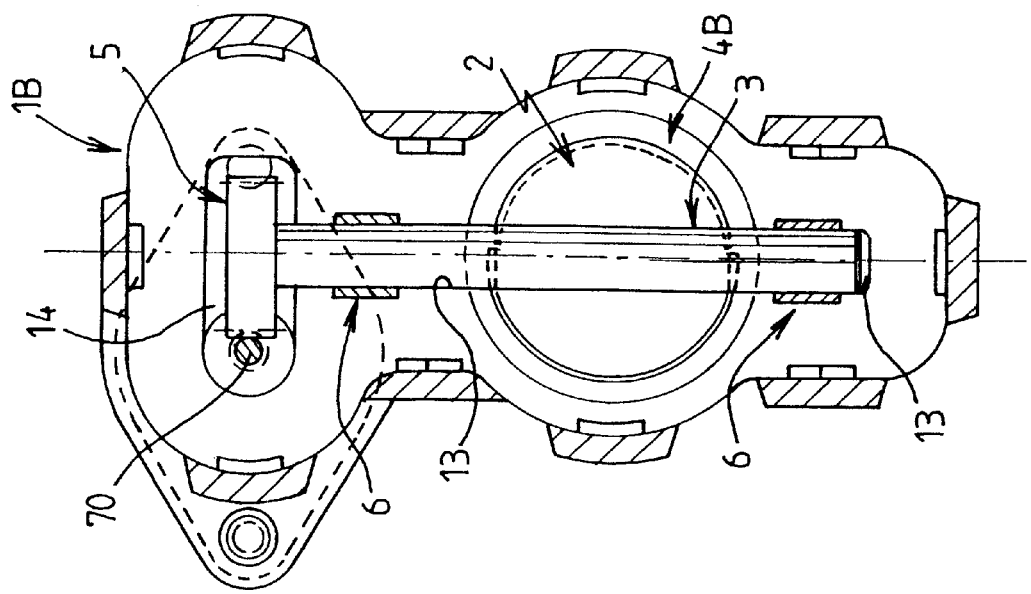
FIG. 4 is a diagrammatic view of the embodiment shown in FIG. 2 as seen from the left-hand side and in section taken along the line III—III in FIG. 2.

The device according to the invention shown in FIGS. 2 and 4 and also shown in FIG. 1 in section taken along the line I—I in FIG. 2 is driven by a stepper motor, for example.

To be more precise, for the purpose of actuating the butterfly valve 2, the spindle 3, which is fitted into respective semi-cylindrical casings 13 recessed into the joint surfaces of the two casing members 1A, 1B and is carried by rings 6 accommodated in facing compartments of those casing members 1A, 1B, is extended on one side into the casing 1, projecting into a chamber 14 opening to the outside of the casing, to be more precise of the casing member 1B, and to the projecting region of the spindle 3 is fixed a gear 5 accommodated in the chamber 14 and whose central axis is aligned with the longitudinal axis of the spindle. A motor 7, such as a stepper motor, is fixed to the exterior of the casing member 1B so that its output shaft 70 enters the chamber 14, in which it is orthogonal to the pivot axis of the spindle 3 and the gear 5; the output shaft 70 takes the form of a lead screw whose threads mesh with the teeth of the gear 5 in the chamber 14 so that rotation of the shaft 70 of the motor drives that of the gear 5, the spindle 3 and the butterfly valve 2.

Figure 3:
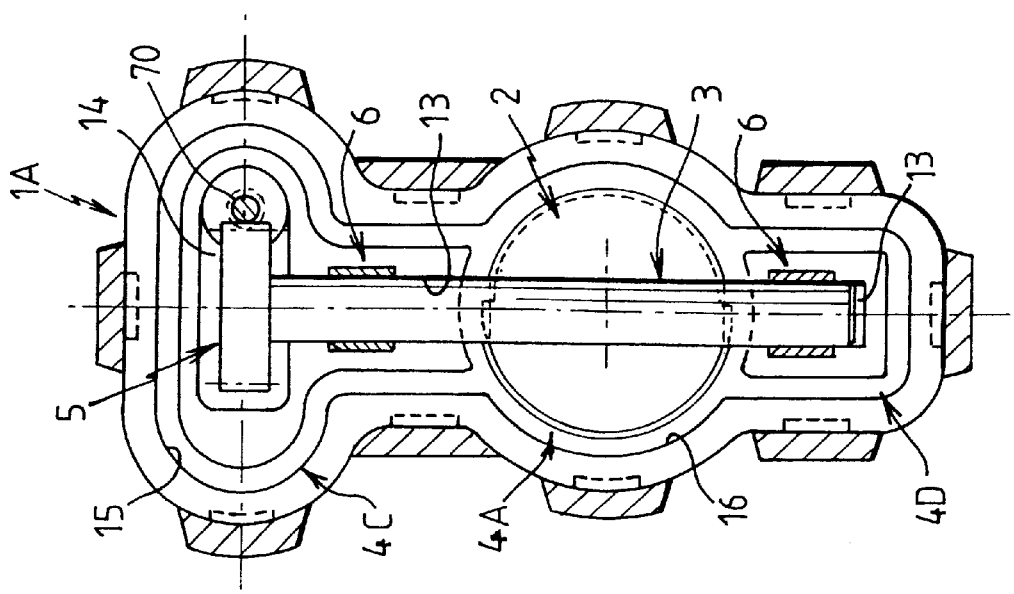
FIG. 3 is a diagrammatic view of the embodiment shown in FIG. 2 as seen from the right-hand side and in section taken along the line III—III in FIG. 2.

As a variant of the device shown in FIGS. 2 to 4, the free end of the shaft 70 of the motor can be accommodated in the casing, and more particularly in the member 1A, and supported in that member by a bearing, which avoids having the motor shaft extend cantilever-fashion into the chamber 14.

The device as a whole is perfectly sealed because one of the two packings, here the packing 4A, has branches along the contour of the casing member in which it is accommodated a few millimeters from the exterior perimeter of its joint surface.

Two grooves 15, 16 in the joint surface of the casing member 1A from a loop along the exterior perimeter of that surface, a few millimeters away from it and on respective opposite sides of the passage 10; the two grooves are the same depth as the cavity 12 for the packing 4A; a first groove 15 surrounds symmetrically and at a distance the casing 13 and preferably the combination of the chamber 14 and the casing 13 into which is fitted the part of the spindle 3 between the packing 4A and the chamber 14, and includes on respective opposite sides of the casing, and possibly of the chamber, two branches whose ends open into the cavity 12 for the packing 4A; the other groove 16 surrounds symmetrically and at a distance the casing 13 into which is fitted the part of the spindle 3 which extends away from the chamber 14, and also has two branches on respective opposite sides of the casing whose ends open into the cavity 12 for the packing 4A.

The two grooves 15, 16 house respective end sealing loops 4C, 4D in one piece with the packing 4A to which both are attached on each side of the cavities 40 for the spindle 3, respectively. Accordingly, and for example, a first loop 4C surrounds symmetrically and at a distance the combination of the chamber 14 and the casing 13 for the spindle 3, following the exterior perimeter of the joint surface at a distance of a few millimeters, on one side of the passage 10, and the second loop 4D surrounds symmetrically and at a distance the casing 13 for the spindle 3, also following the exterior perimeter of the joint surface at a distance of a few millimeters, on the other side of the passage 10. The thickness of the loops 4C, 4D is equal to that of the packing 4A so that they are also compressed when the members 1A, 1B are pressed together.

Figure 9:
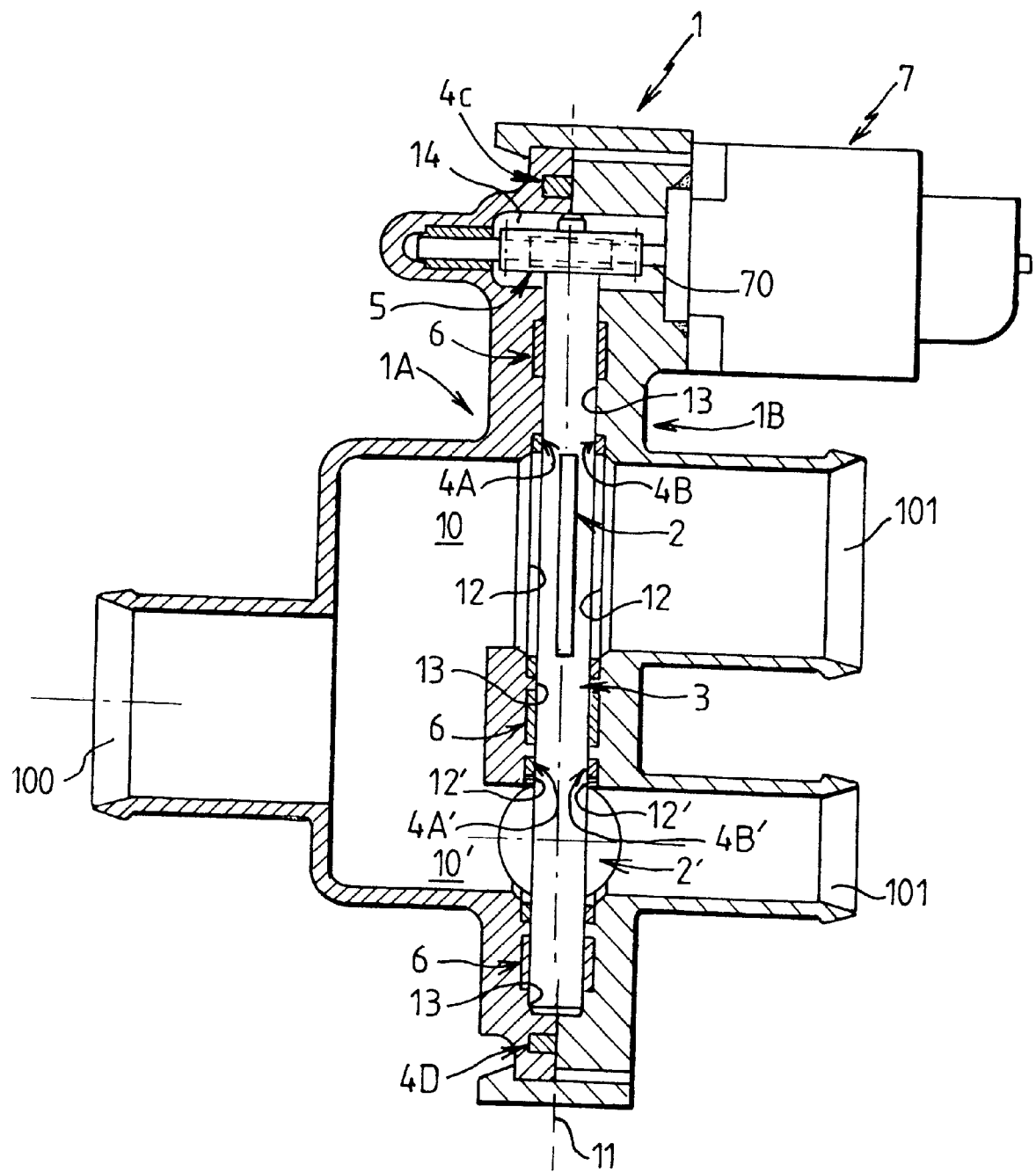
FIG. 9 is a diagrammatic view of another embodiment of a bypass device according to the invention.

The quarter-turn valve device with bypass shown in FIG. 9 is similar to the device shown in FIGS. 1 to 4, common components are designated by the same reference numbers, and points of similarity with the device shown in those figures will not be repeated in detail.

In this instance the device is a three-way device and two fluid flow passages 10, 10' in the casing 1 therefore open to the exterior of the casing via ports 100, 101, 101', one port 100 being common to the two passages, which open into each other on the same side as this port. The longitudinal axes of the two passages are parallel.

The passage 10' contains a butterfly valve 2' fixed to the same pivot spindle 3 as the butterfly valve 2, and in the same manner, but lying in a plane perpendicular to that of the butterfly valve 2; the butterfly valve 2' is therefore fully open when the butterfly valve 2 is closed, and vice versa; in this embodiment the second passage 10', farther from the motor 7 than the first passage 10, has a smaller cross section than the first passage.

The joint surfaces of the casing members 1A, 1B include a cavity 12' all around the perimeter of the passage 10', opening into that passage and enlarging it all along that perimeter; each of the two cavities 12' houses a packing 4A', 4B' projecting slightly from the joint plane 11 when the casing members are not pressed together and the packings are therefore compressed to constituted a sealing ring around the passage 10' when they are pressed together.

The depth of the cavities 12' and the thickness of the packings 4A' and 4B' are the same as those of the cavities and the packings corresponding to the first passage 10.

The passage 10' is also circular.

The sealing ring around the passage 10' also has aligned holes in it, consisting of semicircular cavities formed in the packings 4A', 4B', and in which the spindle 3 is mounted to pivot with sealed contact; the spindle carrying the two butterfly valves 2, 2' therefore extends into the casing between the two butterfly valves and on respective opposite sides thereof into housings 13 provided for it in the two casing members 1A, 1B, in which it is supported by rings 6 in the same manner as previously; however, because the spindle is longer there are three rings 6 on respective opposite sides of and between the two passages.

The arrangements of the packings 4A', 4B' is identical to that of the packings 4A, 4B of the passage 10. The essential difference is that, because the planes of the butterfly valves are perpendicular, one is fully open when the other is closed.

The device is motor-driven in the same way as the previous device, except that, although it is not strictly necessary, to prevent the cantilever-type overhand of the shaft 70 of the motor 7, its free end is guided in the casing member 1A, as already mentioned.

Once again, a perfect seal is provided because one of the two packings, here the packing 4A, has branches along the contour of the casing member in which it is located, a few millimeters away from the exterior perimeter of its joint surface, these branches being accommodated in a set of grooves extending between the cavities 12 around the passages and in loops on either side thereof and at a distance around the casings 13.

The sealing member is therefore formed in one piece with the two packings 4A and 4A', the two loops 4C, 4D and two connecting branches of the packings.

To be more precise, because there are two packings, the two end loops are no longer on respective opposite sides of a single packing 4A, but instead that on the same side as the motor is joined to the nearest packing, which is the packing 4A of the first passage 10, and that on the same side as the free end of the spindle 3 is joined to the nearest packing, which is the packing 4A' of the second channel 10'; the two packings 4A, 4A' are connected by two connecting branches (which cannot be seen in FIG. 9) on respective opposite sides of the spindle 3, extending between the two packings.

Of course, the invention is not limited to the embodiments described above and shown, and other embodiments can be provided without departing from the scope of the invention, especially embodiments including more than two butterfly valves, and also embodiments with butterfly valves in which one or more butterfly valves are not sealed according to the invention. The electric motor, for example a stepper motor, can be replaced by other motor-drive means, in particular by a wax expansion thermostat, which is heated or cooled, and which is associated with a mobile rod housed in the chamber 14, for example a rod carrying a rack meshing with a connecting gear supported in the chamber in the same way as previously by the spindle of the butterfly valve(s) so that rectilinear movement of the mobile member of the thermostat causes movement of the mobile rod, such as movement in translation, causing the spindle to rotate, by as much as a quarter-turn.

What is claimed is:

1. A device for connecting and isolating fluid conduits, the device including a casing (1) incorporating at least one fluid passage (10) discharging from the casing via ports adapted to be connected to the conduits and containing at least one butterfly valve (2) fixed to a spindle (3) which can pivot about its longitudinal axis, characterized in that the casing includes two casing members (1A, 1B) having respective joint surfaces which are pressed together in at least one joint plane crossing the passage transversely and passing through the axis of the spindle, and the joint surfaces each include a cavity (12) enlarging the passage all around its perimeter and in which a packing (4A, 4B) is housed, the two packings facing each other across the passage and being pressed together in the joint plane to constitute a sealing ring which incorporates two aligned holes (40) in which two regions of the spindle on respective opposite sides of the butterfly valve are mounted to pivot in sealed contact all around their perimeter, and each packing has a first inside wall portion (41) between the holes on one side of the passage with dimensions adapted to enable the butterfly valve to pivot on this side from a fully open position in which it is approximately longitudinal in the passage to an approximately transverse closed position, and a second internal wall portion (42) between the holes on the other side of the passage and having dimensions adapted to prevent access to the closed position from the side, the first internal wall portion of each packing being adjacent the second portion of the other packing, each second portion projecting farther into the passage than the adjacent first portion over at least part of the length of the packing, to define a face (43) extending transversely to the perimeter of the passage, from one hole of the sealing ring to the other, forming a seat for the butterfly valve, the faces of the two packings forming seats facing in opposite directions.

2. A device according to claim 1, characterized in that on respective opposite sides of the butterfly valve the spindle (3) is accommodated in housing (13) provided for it in the two casing members (1A, 1B) and the joint surface of at least one of the two members incorporates grooves (15, 16) on respective opposite sides of the passage (10), in the form of loops surrounding the housings (13) at a distance and discharging into the cavity (12) for the packing (4A) of the member (1A), and sealing loops (4C, 4D) in one piece with the packing (4A) are accommodated in the grooves (15, 16).

3. A device according to claim 2, further comprising a motor (7) fixed to the exterior of a casing member (1B), wherein the spindle (3) is extended on one side of a passage (10) and projects into a chamber (14) of the casing into which an output shaft (70) of the motor also projects, and the output shaft (70) is connected to the spindle (3) by connecting means so that rotation of the shaft drives rotation of the spindle, and characterized in that one of the grooves (15, 16) surrounds at a distance a combination formed by the chamber (14) and a housing (13) for the spindle and a sealing loop (4C) in one piece with a packing (4A) is housed in said groove (15).

4. A device according to claim 2, characterized in that it includes at least two passages (10, 10') in the casing (1) in each of which there is a butterfly valve (2, 2').

5. A device according to claim 1, further including at least two passages (10, 10') in the casing (1) in each of which there is a butterfly valve (2, 2').

6. A device according to claim 5, characterized in that the passages (10, 10') discharge to the exterior of the casing via ports (100, 101, 101') one of which is common to those passages, which open into each other on the same side as that port (100).

7. A device according to claim 6, characterized in that the butter fly valves(2, 2') are fixed to the same spindle (3) and are in perpendicular planes so that one is fully open when the other is closed.

8. A device according to claim 1, characterized in that the butterfly valves (2, 2') are fixed to the same spindle (3) and are in perpendicular planes so that one is fully open when the other is closed.

9. A device according to claim 5, characterized in that, around each passage (10, 10'), the joint surfaces of the two casing members (1A, 1B) each have a cavity (12, 12') enlarging the passage all around its perimeter and in which a packing (4A, 4B, 4A', 4B') is accommodated, the two packings around each passage being pressed together at the joint plane to constitute a sealing ring with aligned holes through it in which two regions of the spindle are mounted to pivot in sealed contact all around their perimeter, the two packings each having a face (43) forming a seat for the butterfly valve, the faces of the two packings forming seats facing in opposite directions.

10. A device according to claim 5, characterized in that the same spindle (3) carries the two butterfly valves and extends in the casing on respective opposite sides of and between the two butterfly valves in housings (13) in which it is supported by rings (6), and the joint surface of at least one of the two casing members (1A, 1B) incorporates grooves between the cavities (12) surrounding the passages (10, 10') and in respective loops in either side of the passages at a distance around the housings (13), and said grooves accommodate connecting branches of the packings (4A, 4A') and the sealing loops (4C, 4D) in one piece with the packings.

11. A device according to claim 1, further including a motor (7) fixed to the exterior of a casing member (1B), wherein the spindle (3) is extended on one side of a passage (10) and projects into a chamber (14) of the casing into which an output shaft (70) of the motor also projects, and the output shaft (70) is connected to the spindle (3) by connecting means so that rotation of the shaft drives rotation of the spindle.

12. A device according to claim 1, further comprising motor-drive means consisting of a wax expansion thermostat, and wherein the spindle (3) is extended on one side of a passage (10), projects into a chamber (14) of the casing into which a mobile rod associated with the thermostat also projects, and the mobile rod is connected to the spindle (3) by connecting means so that movement in translation of the mobile rod drives rotation of the spindle.

13. A device according to claim 2, further comprising motor-drive means consisting of a wax expansion thermostat, and wherein the spindle (3) is extended on one side of a passage (10), projects into a chamber (14) of the casing into which a mobile rod associated with the thermostat also projects, and the mobile rod is connected to the spindle (3) by connecting means so that movement in translation of the mobile rod drives rotation of the spindle, and characterized in that one of the grooves (15, 16) surrounds at a distance a combination formed by the chamber (14) and a housing (13) for the spindle and a sealing loop (4C) in one piece with a packing (4A) is housed in said groove (15).

* * * * *